United States Patent [19]

Boer et al.

[11] Patent Number: 5,793,765
[45] Date of Patent: Aug. 11, 1998

[54] METHOD FOR SELECTING LINKS IN NETWORKS

[75] Inventors: Cornelis Boer, Delft; Johannes Cornelis De Kruif, Uithoorn, both of Netherlands

[73] Assignee: Koninklijke PTT Nederland N.V., Netherlands

[21] Appl. No.: 612,905

[22] PCT Filed: Sep. 6, 1994

[86] PCT No.: PCT/EP94/02951

§ 371 Date: Mar. 6, 1996

§ 102(e) Date: Mar. 6, 1996

[87] PCT Pub. No.: WO95/07586

PCT Pub. Date: Mar. 16, 1995

[30] Foreign Application Priority Data

Sep. 7, 1993 [NL] Netherlands ................ 9301544

[51] Int. Cl.⁶ .................................................. H04L 12/28
[52] U.S. Cl. .................................. 370/395; 370/401
[58] Field of Search ............................. 370/351, 227, 370/254, 388, 400, 402, 404, 409, 401, 395

[56] References Cited

U.S. PATENT DOCUMENTS

| 5,491,690 | 2/1996 | Alfonsi et al. | 370/404 |
| 5,495,479 | 2/1996 | Galaand et al. | 370/404 |
| 5,598,532 | 1/1997 | Liron | 370/254 |
| 5,652,751 | 7/1997 | Sharony | 370/227 |

FOREIGN PATENT DOCUMENTS 0343611  11/1989  European Pat. Off. ........ H04L 11/20

OTHER PUBLICATIONS

D.D. Dimitrijevic et al., "Routing In Multi-Domain Networks", Proceeding of IEEE, Apr. 1991, vol. 1, pp. 257–264.

G.M. Huang et al., "A Parallel Textured Algorithm for Optimal Routing In Data Networks", Proceeding of IEEE Globecon, Dec. 1991, vol. 3, pp. 1701–1705.

Draft Recommendation G.803, "Architectures of transport networks based on the synchronous digital hierarchy (SDH)", CCITT Study Group XVIII/7, Geneva, 9–19 Jun. 1991, pp. 1–65.

Definition of the MTN Network Level View, CCITT SGXV Experts, Apr. 25, 1993, pp. 1–27.

*Primary Examiner*—Hassan Kizou
*Assistant Examiner*—Shick Hom
*Attorney, Agent, or Firm*—Michaelson & Wallace; Peter L. Michaelson; John C. Pokotylo

[57] ABSTRACT

Determining, in a transport network, a link between a source and a destination. The network is partitioned into subnetworks between which sublinks are determined. Each subnetwork has access points which indicate the transport capacity of the subnetwork between the access points. The sublinks, in each case, extend from a first access point to a second access point. In a network having a distributed control, the sublinks are determined successively between the link already determined and a remaining subnetwork. In this arrangement, the remaining subnetwork, in each case, includes an access point already associated with the destination and does not include an access point already associated with the link. Preferably, the access points, in each case, indicate the available capacity of a subnetwork.

11 Claims, 2 Drawing Sheets

METHOD FOR SELECTING LINKS IN NETWORKS

BACKGROUND OF THE INVENTION

The invention relates to a method for determining, in a transport network, a link between a source and a destination, and to networks which are designed for implementing such a method.

The term "network" will here in particular be taken to refer to a transport network for transporting goods and/or information. A (transport) network may in this context, for example, be a telephone network, consisting of an infrastructure having links, nodes and exchanges, but also a goods transport network, consisting of a number of transport links (such as rail links) and transshipment stations. Below, some terms will be expounded with reference to examples from communications technology.

In networks for the transport of information (communication networks), links may in principle be set up in two ways: from a central point which has an overview of the entire network (central or centralized network control), or from points situated on the transport link (distributed network control). In the case of a central control (central control system), in principle all sublinks from source to destination can be determined and created from the central control. Since there is available, to the central control, information concerning the entire network, an efficient link can be selected.

In the case of a distributed control (distributed control system), control and thus the information required therefor is distributed over the network. Since in this case certain information, such as topological information, must be present simultaneously at different points, this involves duplication of information. In each case, a local control unit selects a sublink on the basis of the information available to it. The entire link is built up, step by step, from sublinks which are selected in each case between a switching point and a next switching point. In this context, the control units can be relatively simple. Owing to the control units lacking information relating to the entire network, in general less efficient links, however, may be chosen in the case of a distributed control.

Although more efficient links are possible with a central control, determining links in relatively large centrally controlled networks in practice proves to require a complicated and therefore expensive control. Another important drawback of the prior art is the fact that, in networks with different types of controls (centralized control and distributed control) different types of control information are required for determining links, which complicates the coupling of networks with different types of controls. Some examples of Prior Art techniques are disclosed in the following references:

EP-A-0 343 611 (reference 4) discloses a routing method for fast packet switched systems, as well as a fast packet switching communications system. The network has a distributed control structure. The processing units which evaluate a global cost function control only part of the links involved. This reference does not deal with networks having a centralized control.

The article by Dimitrijevic (reference 5) discloses a hierarchical routing algorithm for multi-domain networks, each network consisting of several individually controlled domains. A so-called Integrated Network Control Center manages overall network performance based on a limited amount of information about the entire network. The disclosed algorithm is only applicable to networks having the above-mentioned type of control.

The article by Huang (reference 6) discloses a routing algorithm for data networks. In the algorithm, a large-scale network is decomposed into several smaller networks, which in turn are organized into several levels containing independent subnetworks. This so-called textured algorithm is not suitable for networks having a centralized control.

SUMMARY OF THE INVENTION

The object of the invention is to avoid the abovementioned and other drawbacks of the prior art and to provide a method for determining links in a network, which:

provides for simple and effective setting up of links, so that a relatively simple control can be used, largely simplifies the process of combining networks having a central control and networks having a distributed control, and is independent of the type of the network or of the technology used.

A further object of the invention is to provide a network in which the method according to the invention is embodied and which therefore offers the abovementioned advantages. Such a network may have both a distributed and a centralized control structure.

To this end, the method according to the invention is characterized in that the network is partitioned into subnetworks between which sublinks are determined, each subnetwork being assigned access points which indicate the status of said subnetwork, such as the transport capacity between its access points, the sublinks in each case extending from a first access point to a second access point, and the sublinks to be determined being reduced in size by repeated partitioning of the subnetworks.

According to the invention, the network is therefore partitioned into (abstractions of) subnetworks, the status, in particular the transport capacity on a link to an adjacent network, of each subnetwork being indicated at so-called access points. At these access points, properties of the network are grouped, i.e. network elements and their properties are represented in a functionally combined way at a higher abstraction level. By means of the combined representation of network elements it is possible to determine a suitable link in a simple manner, without the need of using, in selecting the link, detailed information relating to the individual network elements. As a result, a substantial simplification in the control can be achieved. The repeated partitioning provides a substantially recursive procedure which expediently provides for a simplified determination of sublinks.

The partitioning of subnetworks when determining a link has the advantage that the sublink to be determined becomes smaller and that consequently less control information is required for selecting a sublink. Preferably, the partitioning into subnetworks is arranged in a fixed manner, i.e. essentially permanently, in the network, and each subnetwork is assigned a control for determining links in that subnetwork. It will be obvious that such a control needs only a relatively small amount of control information at its disposal and can be relatively simple. Such a control of a subnetwork may, for example, be a part of the central control of a centrally controlled network which is reserved for controlling the subnetwork in question, or a (part of a) control unit in a network having a distributed control.

It should be noted that the partitioning of networks into subnetworks is known per se in communications technology and is described, for example, in CCITT (ITU) Recommendation G.803. The known partitioning of networks does not, however, relate to the determination of links but to the administrative division of a network for the purpose of network management. Certain aspects of the present invention may therefore be regarded, in a certain sense, as an extension to the said CCITT recommendation by making these applicable to the determination of links, as will become apparent from the following.

As was mentioned above, in practice the process of causing networks controlled in a central and distributed manner to cooperate is complicated. The invention now offers the possibility of considerably simplifying said cooperation by applying, in both types of networks, essentially the same method for selecting links. In this case, the determination of links in centrally controlled networks takes place by continuing to partition the subnetworks into subnetworks which in each case, do not overlap, after which sublinks between these subnetworks are determined.

When applied in a network having a distributed control, the method according to the invention is preferably implemented in such a way, that a source access point is associated with the source and a destination access point is associated with the destination, the first access point initially being equated with the source access point, after which the following steps are carried out repeatedly until the first access point is equated with the destination access point:

equating the second access point with an access point of a subnetwork which excludes the first access point and includes the destination access point, said subnetwork being chosen in such a way that a sublink can be determined between the first access point and the second access point, recording the sublink thus determined, equating the second access point with the first access point.

As a result of a number of steps being carried out repeatedly, the desired link between source and destination is determined in a simple manner by means of sublinks selected in each case. In essence, this embodiment of the method according to the invention in each case determines the best (sub)link between the last access point of the previously located link and the next subnetwork. In the process, the successive subnetworks continue to shrink, so that the last subnetwork ultimately comprises only the destination access point.

In contrast to the method in the case of centrally controlled networks, in which a (sub)network is partitioned in successive steps into separate subnetworks which do not overlap, in the case of networks controlled in a distributed manner, use is made according to the invention of subnetworks which in principle at all times have at least one access point in common, viz. the destination access point. Within a particular step, subnetworks which are alternatives to one another may partially overlap. In the process, selected subnetworks will in general in each case lie within previously selected subnetworks.

In a network having a centralized control, the invention provides for a source access point to be associated with the source and a destination access point to be associated with a destination, the first access point initially being equated with the source access point and the second access point initially being equated with the destination access point, after which the following steps are carried out repeatedly until an unbroken chain of sublinks has been determined between the source access point and the destination access point:

selecting mutually exclusive subnetworks, each having a first access point and a second access point, this selection being carried out in such a way that it is possible to determine a sublink between a second access point of a subnetwork and a first access point of a further subnetwork, recording the sublink thus determined, partitioning the subnetworks into further subnetworks.

Thus the efficient determination of links in a network having a centralized control is made possible, while at the same time a very large degree of analogy is provided to the determination of links in networks having a distributed control. It is thus ensured, according to the invention, that the information exchanged between a controlling network and a controlled subnetwork is identical for both the centralized and the distributed control model. It should be noted in this context that, as will be explained below in more detail, (sub)networks are preferably each provided with a (type of) control ("manager") for controlling one or more subnetworks. In turn, controlled subnetworks are preferably each provided with a control element ("agent") for carrying out commands output by controls.

According to the invention, use is made, for the purpose of coupling a network having a centralized control and a network having a distributed control, of a corresponding functional division of the respective controls, so that control information having a universal structure is exchanged between the controls. It will be obvious that the control information structure, universal for the networks concerned, is the direct consequence of the corresponding ways in which links are determined in networks having both a distributed and a centralized control. The said functional division of the respective controls is in this case related to the partitioning of a network into subnetworks which, as already indicated above, in principle each have a (type of) control.

Preferably, the method according to the invention is carried out in such a way that an access point in each case represents the available transport capacity of the subnetwork in question. According to the prior art, the total capacity of the (sub)network in question is indicated in an access point. The determination of links can, however, be carried out more efficiently if, according to the invention, only the available transport capacity, i.e. the transport capacity which is free at that moment, is indicated in an access point. Thus, the situation where a selected link is found to be unusable owing to a high load is avoided. An access point may advantageously represent not just the available transport capacity, but also other factors such as the load level (occupancy factor), the delay and/or the blocking probability of a particular subnetwork.

The access points in the method according to the invention have at their disposal various types of information. Thus, it is defined in the access points, which network elements are contained in the subnetwork in question (incorporation relationship) and to which other access points the access point can be linked (connectivity relationship). Furthermore, an access point preferably has at its disposal, as mentioned before, information relating to the load level of the subnetwork in question.

For the purpose of determining subnetworks and access points, the network is preferably modelled in an object-oriented manner, an object representing the control information in question. With the aid of the object-oriented modelling and programming method, known per se inter alia from reference 3, an efficient way of modelling is possible, which is highly suitable for the present application and whereby the network and the network elements present therein can be divided into subnetworks in an expedient manner.

A transport network can advantageously be designed for implementing the method according to the invention. To this end, the control elements of the network may, for example, be provided with suitable software. As mentioned above, networks for physical transport, for example networks for transporting goods, may likewise be designed for applying the invention. Such transport networks may, for example, comprise a rail network, but also transport links which are accomplished, for example, by means of ships or aeroplanes. In this context, the invention can be applied to determining suitable transport links having adequate capacity. The invention may further be applied in devices and device assemblies whereby goods are transported, such as sorting appliances, factories with conveyor belts and the like.

Advantageously, communication networks are designed for determining and creating links in a manner according to the invention. One type of communication network, in which a very efficient link set-up can be achieved with the aid of the invention, is designed for (data) communication in accordance with the asynchronous transfer mode (ATM).

In summary, according to the invention, setting up a link between a source and a destination in a transport network may take place as follows:

1. Repeatedly defining subnetworks in the transport network on the basis of, for example, geographic criteria, a subnetwork forming a representation of a set of subnetworks at a lower abstraction level.
2. Defining potential access points (as abstractions of elements at a lower network layer) on the basis of the amount of available capacity for free usage, the delay and/or the blocking probability on the network layer (transport layer) in question.
3. Defining relationships between the access points, the mapping, by an access point, of a plurality of access points of a lower abstraction level being described by means of incorporation relationships, and possible links between access points at a particular level being described by means of connectivity relationships.
4. Receiving a transport command (generated outside the network in question) from the source to the destination.
5. Localizing, with the aid of incorporation relationships, source and destination at a lower abstraction level.
6. Identifying, with the aid of connectivity relationships, possible paths (links) between a source network and a destination network (a network element being regarded as a smallest subnetwork).
7. Making a selection from identified paths with the purpose of optimizing the performance of the network.
8. Giving a transport subcommand from a higher to a next lower abstraction level.
9. Repeating the steps 5 to 8, the command being carried out at the lowest abstraction level.
10. Reporting back the execution to the next higher abstraction level, the sublink selected being made known to the higher abstraction level with the purpose of passing on this information to the following (sub) network.
11. Said next higher level checks whether yet more transport subcommands have to be emitted. If this is the case, the procedure returns to step 8.

In the above, it is also stated that the creation of links is performed by network elements at a lower network layer. In this context, the term network layer is understood to mean part of the network which fulfils a particular function. The term network layer should in this case be distinguished from the term abstraction level: within one network layer, a plurality of abstraction levels are possible.

It should be noted that the method according to the invention can be used for merely determining a link, without the link thus determined actually being created.

REFERENCES

1. "The definition of the MTN Network Level View", CCITT SGXV Experts, MTN Management, Woodbridge, N.J., USA, April 1993.
2. CCITT Recommendation G.803
3. J. Rumbaugh: "Object-oriented Modeling and Design", Prentice Hall, N.J., 1991.
4. EP-A-0 343 611 (CSELT).
5. Dimitrijevic, D., et al.: "Routing in multi-domain networks", IEEE Infocom '91, Vol. 1, Bal Harbour (Fla.), U.S.A., April 1991.
6. Huang, G.: "A parallel textured algorithm for optimal routing in data networks", IEEE Globecom '91, Vol. 3, Phoenix (Ariz.), U.S.A., December 1991.

The above citations are herewith incorporated by reference in this text.

BRIEF DESCRIPTION OF THE DRAWING

The invention will be explained below in more detail with reference to illustrative embodiments depicted in the figures.

DETAILED DESCRIPTION OF THE DRAWING

Figure 1:
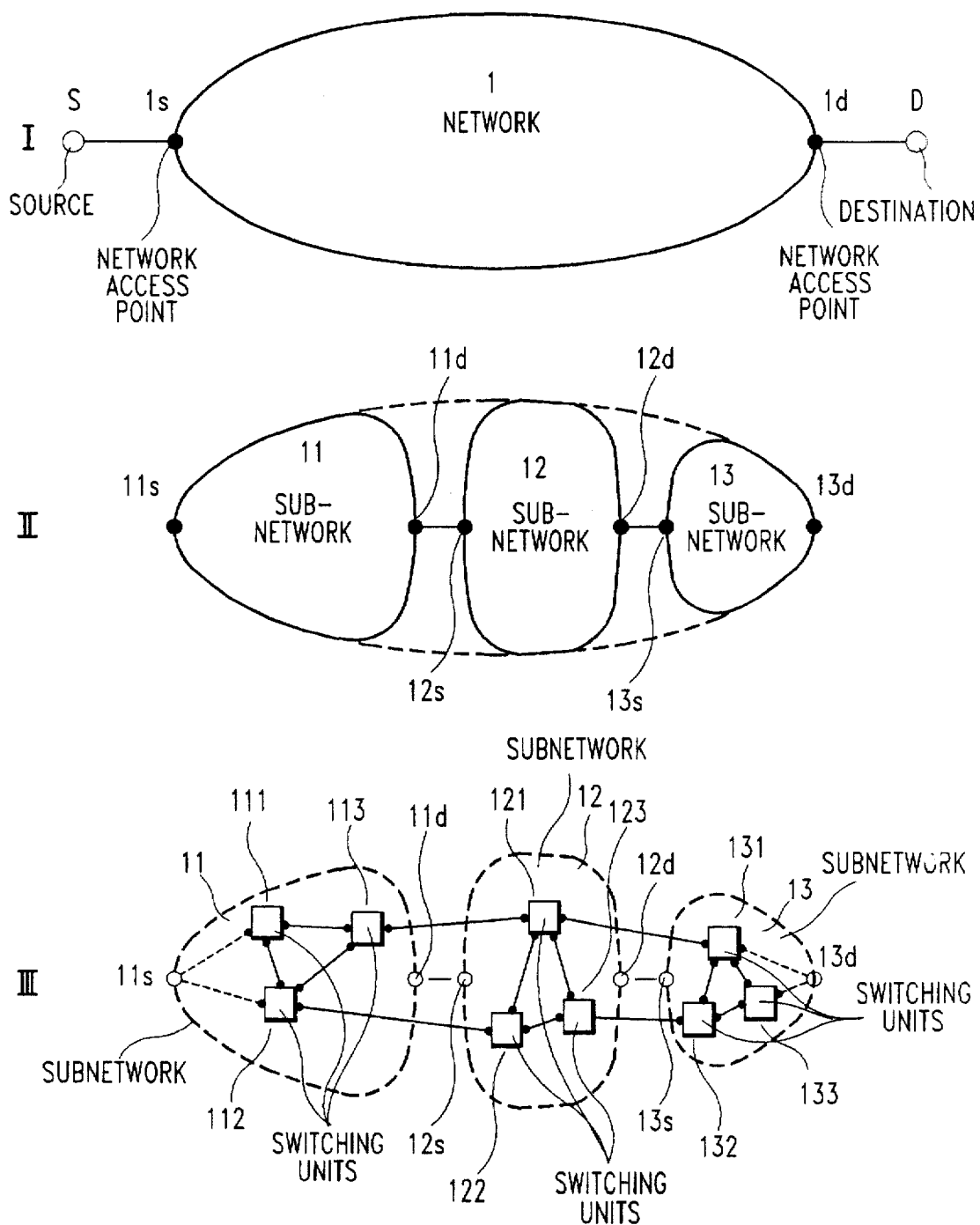
FIG. 1 shows, schematically, the determination of a link in a network having a centralized control.

FIG. 1 depicts a transport network at various abstraction levels. At the highest abstraction level, level I, the network 1 can be regarded as a single unit, i.e. a single network in which it is not possible to distinguish individual links. A source S and a destination D are associated with the access points 1s and 1d, respectively, of the network 1. In this arrangement, the source S and the destination D may be incorporated in the access points 1s and 1d themselves, or they may be directly linked to said access points, as depicted in FIG. 1. For the sake of clarity, the access point 1s associated with the source will be called the source access point. Entirely analogously, the access point 1d is called the destination access point. Via these two access points, it is possible, in principle, to create a link between the source S and the destination D by means of the network 1.

In the figures, the access points of other subnetworks will likewise be designated with the letters s (source) and d (destination). Since, in the examples depicted, the determination of a link always takes place from left to right in the figures, a source access point is situated to the left, and a destination access point is situated to the right of a subnetwork (or network element).

At abstraction level II, the network 1 can be considered to be divided into three subnetworks 11, 12 and 13. The access point 11s of subnetwork 11 is represented, at level I, by access point 1s, while the access point 13d of subnetwork 13 is represented, at level I, by the access point 1d of the network 1. In essence, the access point 1d at level I forms an abstraction or mapping of the access point 13d at level II. Likewise, the access point 1s at level I forms an abstraction or mapping of the access point 1d at level II. In a similar manner, the access points at level II form abstractions of network elements on a lower level, as will be explained below in more detail. If required, other access points of parallel subnetworks (not shown in FIG. 1) at lower abstraction levels may additionally be mapped in the access points 1s and 1d.

At level III, in the present example, physical network elements are depicted schematically. It will be obvious, however, that more than three levels are often used in practice, so that it is possible to obtain, at a subsequent level, a further partitioning of the subnetworks depicted at level II. Likewise, it is possible to use, at level II or at another level, more than three subnetworks. The network elements, here depicted at level III, of the subnetwork 11 comprise a first, a second and a third switching unit 111, 112 and 113, connected by suitable lines. Likewise, the network elements depicted as subnetwork 12 at level II comprise, at level III, the network elements 121, 122 and 123 with their mutual links depicted, and the network elements of subnetwork 13 comprise the network elements 131, 132 and 133 with lines between them. It goes without saying that the subnetworks depicted can each comprise more or, alternatively, fewer than three network elements, and that the lines between them depicted only serve by way of example.

In FIG. 1, the network elements (for example switching units) 111, 112, 113, 121, 122 etc. are, like the subnetworks, provided with access points. Thus the access point 11d forms a mapping or abstraction of the access points (not designated as such in FIG. 1) 113d and 112d. These access points of network elements correspondingly indicate the available capacity and other status parameters of the network elements in question.

The capacity of the line (link path) which links the network elements 113 and 121 is indicated, together with the capacity of the line which links the network elements 112 and 122, at level II by the access points 1d and 12s. The access point 12s further indicates the capacity, or more generally the status, of the (sub)network 12. An access point therefore generally forms, as stated earlier, an abstraction of a plurality of points, grouped together, of a lower network layer. Access points may also provide information concerning matters such as load level, blocking probability and delay, it being possible to compare alternative routes on the basis of this information.

It should be noted that the word line is used here by way of example of a network element which embodies a branch of the physical transport network. It will be clear that the branches of the network can also be formed by other network elements. Within communications technology these could take the form of beam links and the like.

For the purpose of determining and creating a link between the source S and the destination D with the aid of the network 1, a request to establish a link is transmitted to the network 1. The network 1 then attempts to determine a suitable link, i.e. a link having adequate transport capacity, between the points 1s and 1d. At level I, at which the network is represented as a single unit, individual links cannot be distinguished. For the purpose of selecting a suitable link, use is therefore made advantageously, at a lower abstraction level, of the abovementioned subnetworks. The subnetworks, as stated previously, form abstractions of parts of the (physical) transport network. It will be obvious that the use of abstractions, in which the relevant details of the (physical) network have been omitted, simplifies the selection of a link, as will also be illustrated below.

A link between the source S and the destination D, i.e. between the access points 1s and 1d, is determined by first identifying, at level II, the relevant subnetworks and access points. In the case of a network having a central or centralized control, as depicted schematically in FIG. 1, the control of the network 1 is aware of the topology of the subnetworks. In other words, the network 1 can determine via which subnetwork the desired link can be selected.

Information required in the subnetworks in order to be able to determine a link, comprises two relationships, viz. the incorporation relationship and the connectivity relationship. The incorporation relationship specifies which access points are comprised in a particular subnetwork, while the connectivity relationship specifies which access point can be linked to which other access point. The information implicated in these relationships is preferably present in each (sub)network.

As has been explained above, the access point 1s is a mapping, i.e. a representation at a higher level, of the access point 11s of the subnetwork 11. For this subnetwork, as for the other subnetworks, a separate form of control is provided, for example in the form of a reserved part of the control of the network 1. The subnetwork II receives from the network 1 a command for selecting a link from the access point 11s to the access point 11d. To this end, the subnetwork II in turn can output control signals to the relevant network elements which are represented by the subnetwork 11, viz. the network elements 111, 112 and 113. It is then possible for an actual link within the subnetwork 11 to be created by these network elements via one or more of the lines.

After determining and creating, at level III, the desired link from the access point 11s to the access point 11d, the subnetwork 11 at level II receives a confirmation thereof. This confirmation is reported back, by the control which has been provided for the subnetwork 11, to the network 1 at level I. Thus, the control of the network 1 learns that a link has been selected and possibly been created between the access points IIs and 11d. It is also reported back whether the selected link runs via 112 or 113, in order to be able to make it known whether it is necessary to continue, in subnetwork 12, with 121 or 122.

The network 1 then commands the subnetwork 12 to select a link in said subnetwork 12, specifically between the access points 12s and 12d, the access point 12s indicating the status of the subnetwork 12 and of the network elements present therein. On the basis of this status, in particular the available capacity, the desired link is then selected and created at level III with the aid of the network elements selected.

It will be obvious that it is thus possible for the desired link between the source S and the destination D to be created stepwise by the network 1. In so doing, the network is thus partitioned into subnetworks, the status (for example the transport capacity) of the subnetworks in each case being indicated in the respective access points.

The selection of links by a plurality of coupled networks may present problems in networks controlled in accordance with the prior art. As will be seen below, these problems can be solved by means of the invention.

When a link is selected by a network having a central control, such as the network of FIG. 1, information, viz. control information, is exchanged between the various (sub) networks in a "vertical" direction, i.e. between the (sub) networks of the various levels. If a plurality of such networks are coupled at level I, (control) information should also be mutually exchanged between those networks. In principle, this could take place via a higher abstraction level ("level 0"). This does, however, present the problem that establishing an additional abstraction level (with associated central control) is found to be infeasible in practice. According to the invention, establishing an additional abstraction level can now be avoided by exchanging the control information in a "horizontal" direction between networks at level I. This is made possible as a result of the control information exchanged in a vertical direction being identical in terms of structure, according to the invention, to the control information exchanged in a horizontal direction. It is thus possible, in order for a link to be selected by a number of coupled centrally controlled networks, such as the telephone networks of different countries, in principle, to exchange the same information, or at least the same type of information between the different networks.

A different type of problem arises if a network having a central control is coupled to a network having a distributed control. In a network having a decentralized or distributed control, a link is not selected from above, but is selected and created from network element (switching unit) to network element. In the process, the associated control information is transmitted from network element to network element. Selecting links in networks having a central control therefore requires a type of control information which is different from that for networks having a distributed control. Coupling different types of networks is therefore not readily possible.

As mentioned above, according to the invention a method is provided which, for selecting links in networks having a distributed control, uses control information having the same structure as for selecting links in centrally controlled networks. This makes it possible to couple centrally controlled networks and networks controlled in a distributed manner, without having to convert the control information. By means of the method according to the invention, it further becomes possible to select links in the two types of networks mentioned, with an amount of control information which is smaller than the sum of the required amount of control information which would be required for the two types of networks individually. This is particularly advantageous in communications technology in the case of international links by means of which communication networks of different countries are coupled. As is known, communication networks in some countries have a central control structure, while in other countries a distributed control structure is used. The invention now offers the possibility of permitting different communication networks of this type to cooperate efficiently.

The selection, according to the invention, of a link by a network having a distributed control will be explained in more detail with reference to FIG. 2.

Figure 2:
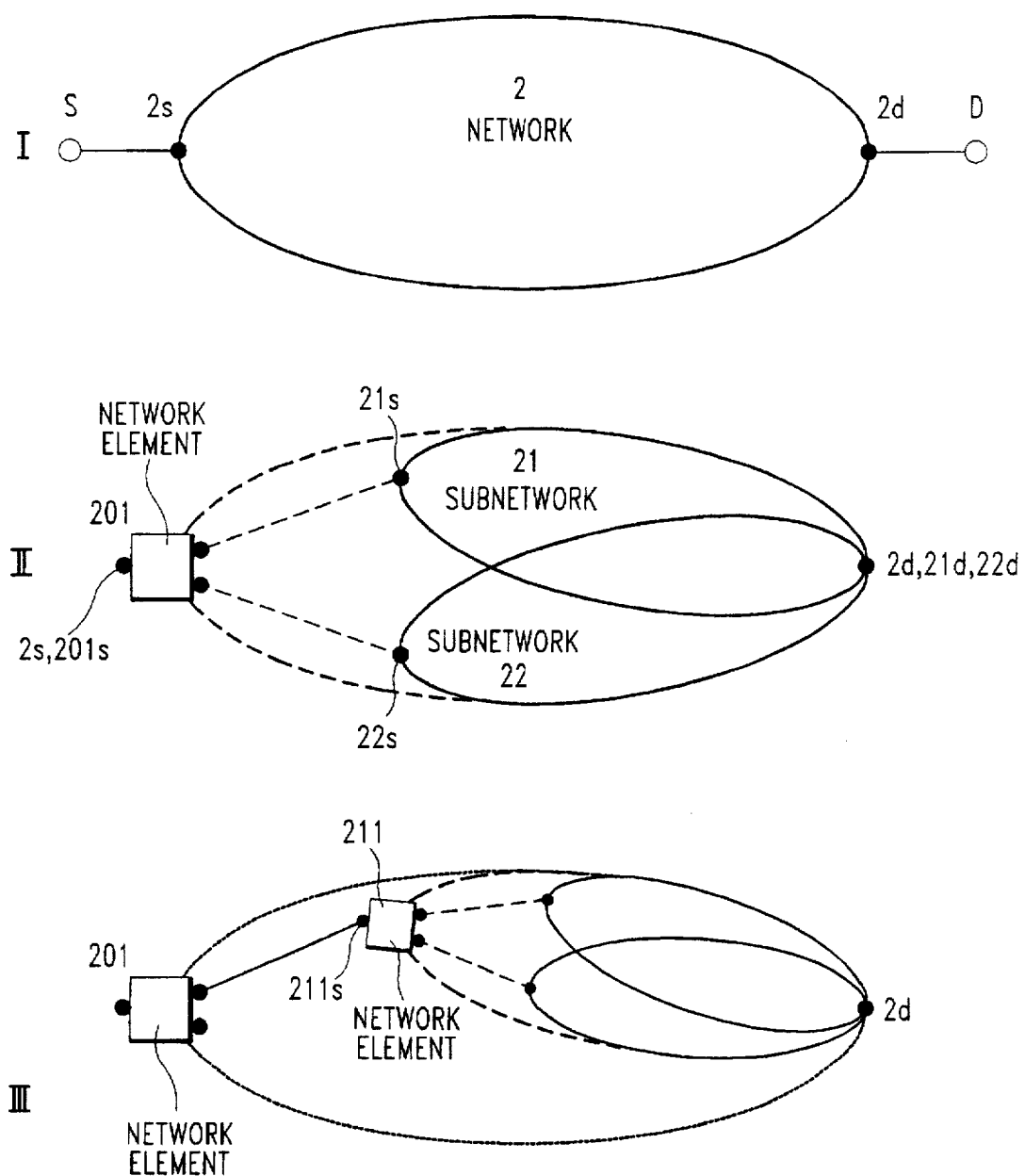
FIG. 2 shows, schematically, the determination of a link in a network having a distributed control.

FIG. 2 shows a network 2 which, like the network 1 of FIG. 1, is linked via respective access points 2s and 2d to a source S and a destination D. The network 2, however, has a distributed control which implies that the topological structure of the network 2 is not known at one central location (in a central control), but is distributed over the network elements. The network 2 is thus not able to identify from above, as in the case of the network 1 of FIG. 1, subnetworks via which the desired link must or can be selected. According to the invention it is possible, however, to select the link in such a way that it is nevertheless possible to achieve a very large degree of analogy with the centrally controlled case.

In a manner corresponding to the case of FIG. 1, the network 2 receives, at level I, the highest abstraction level, a command to select a link between the access point 2s and the access point 2d. Now, however, in accordance with the distributed manner of control, a link is sought not from the coordinating network 2, but from the access point 2s. According to the invention, the network, also in the case where it is provided with a distributed control, is divided into subnetworks in order thus to provide an analogy with networks having a centralized control, and thus with the control information used in those networks. According to the invention, use is therefore made, at level II, the highest abstraction level but one, of subnetworks of the network 2, the subnetworks not comprising the source access point 2s, but indeed comprising the destination access point 2d. In this case, said subnetworks may partially overlap, as depicted in FIG. 2, so that certain network elements may belong to both subnetworks. Both the depicted subnetworks 21 and 22 comprise an access point (21d and 22d, respectively) which at level I corresponds to the destination access point 2d, but exclude the source access point 2s. The subnetwork 21 comprises an access point 21s and an access point 21d, the access point 21d corresponding with the access point 2d of the network 2. Likewise, the subnetwork 22 comprises an access point 22s and an access point 22d, the access point 22d corresponding to the access point 2d of the network 2.

The access points 21s and 22s (and possibly other points) are identified with the aid of the incorporation relationship. From this set of identified access points, those points are selected which provide access to the desired destination access point 2d. With the aid of the connectivity relationship, the possible paths (links) between the network element 201 and the points 21s and 22s are then determined. In so doing, the connectivity relationship presents the available capacity of the links in question and the access points 21s and 22s provide information concerning the possible links to 21d and 22d, respectively.

The control of the network 2 now selects, in the said manner, starting from the access point 2s, a suitable link to an access point of one of the sub-networks. At level II, the access point 2s is not represented as such, but as the network element 201 of which the access point 2s at level I is an abstraction. The sublink in question is now sought between access points (201d and 201d', at the right-hand side of 201, not indicated as such in FIG. 2 for the sake of clarity) of the network element 201 and one of the access points 21s and 22s.

According to a preferred embodiment of the present invention, the source access points of the subnetworks, in the present case the access points 21s and 22s, do not indicate the total transport capacity, but instead the available transport capacity of the subnetwork in question. That is to say, the network elements which are mapped in the access points 21s and 22s interrogate the respective subnetwork for the available transport capacity and have at their disposal the capacity value(s) in question. The network now selects the link which leads to a subnetwork having a suitable available transport capacity (in general: having a suitable status). The said status may, incidentally, also incorporate a cost aspect, for example the costs of the transport via the network in question, and an access point may also indicate other status parameters of the (sub)network in question, such as the loading level, the blocking probability and the like.

At a lower abstraction level, in the case depicted level III, the link selected may be created with the aid of the network elements 201 and 211 which are represented at higher levels by access points. In the example of FIG. 2, it has been assumed that the link has been selected via the subnetwork 21. Then, from the access point 21s, a further link is selected by considering subnetworks of the subnetwork 21. Thus the above-described procedure is applied recursively, until the access point from which a link has to be sought corresponds to the destination access point 2d. Each time a subnetwork is thus selected which is contained within the previous (sub)network. Alternative subnetworks within a particular subnetwork may partially overlap.

It should be noted that the complete determination of a link in FIG. 2 requires more than the three levels depicted, since at level III a few subnetworks still remain, whose subnetwork elements participating in the link have not yet been determined.

A difference between the manner of partitioning centrally controlled networks and networks controlled in a distributed manner resides in the fact that, in centrally controlled networks, the subnetworks of a particular (sub)network exclude one another, i.e. a (sub)network is divided into subnetworks which do not overlap. In networks controlled in a distributed manner, a (sub)network is divided into subnetworks which can indeed overlap. Moreover, in this case, the subnetworks to be considered are selected in such a way that they always include the destination access point, whereas with networks having a central control only some of the subnetworks to be considered contain the destination access point. Furthermore, in centrally controlled networks, the access point of a subnetwork from which a (further) link has to be selected, in each case forms part of a subnetwork to be considered. In networks controlled in a distributed manner, a link to a subnetwork is selected from an isolated access point.

The information which is exchanged, in the method according to the invention, between the subnetworks in question and access points of a network controlled in a distributed manner, largely corresponds to information which is exchanged in the case of a centrally controlled network between the various subnetworks. Thus a large degree of compatibility of the two control methods is achieved.

The partitioning of a network into subnetworks can be carried out while a link is being determined, but is preferably defined in the control of the network. When defining the subnetworks, it is possible to assign to the respective subnetworks control units (controls and control elements) as already stated above. The information exchanged by the controls and control elements is according to the invention identical for centrally controlled networks and networks controlled in a distributed manner.

It will be obvious to those skilled in the art that the invention is not limited to the embodiments shown in the above, and that many modifications and additions are possible without departing from the scope of the invention.

We claim:

1. Method for determining, in a transport network, a link between a source and a destination, the method comprising steps of:
   a) partitioning the transport network into subnetworks;
   b) determining sublinks between the subnetworks; and
   c) designating, for each one of the subnetworks, access points which indicate the transport capacity of the one of the subnetworks between the access points,
   wherein, for each one of the sublinks, the one of the sublinks extends from one of the access points of one of the subnetworks to one of the access points of another of the subnetworks; and
   d) reducing the size of the sublinks to be determined by repeatedly partitioning the subnetworks.

2. The method according to claim 1, wherein the transport network has a centralized control,
   wherein a source access point is associated with the source and a destination access point is associated with the destination, and
   wherein one of the access points of one of the subnetworks is initially equated with the source access point and one of the access points of an other of the subnetworks is initially equated with the destination access point, the method further comprising steps of:
   e) selecting mutually exclusive subnetworks, each having a first access point and a second access point, wherein each one of the mutually exclusive subnetworks has a sublink between the second access point of one of the mutually exclusive subnetworks and a first access point of another of the mutually exclusive subnetworks;
   f) recording the sublink; and
   g) partitioning the mutually exclusive subnetworks into further subnetworks,
   wherein steps (e) through (g) are repeated until an unbroken chain of sublinks has been recorded from the source access point to the destination access point.

3. The method of claim 1 wherein the transport network has a distributed control, and
   wherein one of the subnetworks is a network element, said one of the subnetworks having access points, the method comprising further steps of:
   e) equating one of the access points of the one of the subnetworks with the access point of the transport network;
   f) for each one of the other of the subnetworks, equating one of the access points of the one of the other of the subnetworks with the destination access point of the transport network;
   g) for each one of the other of the subnetworks, defining a link from another one of the access points of the one of the other of the subnetworks to another of the access points of the one of the subnetworks, wherein steps (e) through (g) are repeated until the network element has an access point including the destination access point of the transport network.

4. The method according to claim 1, wherein each of the access points represents an available free transport capacity of a corresponding one of the subnetworks.

5. The method according to claim 1, wherein the transport network is modeled in an object-oriented way.

6. The method according to claim 1, further comprising a step of
   e) allocating, to each one of the subnetworks, a control for determining links within the one of the subnetworks.

7. The method according to claim 1, wherein the transport network comprises a communication network.

8. The method according to claim 7, wherein communication occurs over the transport network through asynchronous transfer mode.

9. The method according to claim 2, further comprising a step of:
   b) coupling the transport network having a centralized control with a network having a distributed using a corresponding functional division of the respective controls, so that control information having a universal structure is exchanged between the controls.

10. The method according to claim 3 further comprising a step of:

h) coupling a transport network having a centralized control and the transport network having a distributed control by using a corresponding functional division of the respective controls, so that control information having a universal structure is exchanged between the controls.

11. A method for determining a link between a source access point of a network an a destination access point of a network, the method comprising steps of:

a) partitioning the network into subnetworks, each one of the subnetworks having a first access point and a second access point, each of the first and second access points indicating a transport capacity of the one of the subnetworks; and b) for at least two of the subnetworks, determining a sublink from the first access point of a first of the two subnetworks, to the second access point of a second of the two subnetworks, wherein a first access point of one of the subnetworks corresponds to the source access point of the network, wherein a second access point of another of the subnetworks corresponds to the destination access point of the network, and wherein steps (a) and (b) are repeated such that at least one of the subnetworks is further partitioned.

* * * * *